(12) United States Patent
Leblanc et al.

(10) Patent No.: US 11,193,369 B2
(45) Date of Patent: Dec. 7, 2021

(54) IN-LINE AMPLIFIER ASSEMBLY FOR DISTRIBUTED SENSING SYSTEM

(71) Applicant: Halliburton Energy Services, Inc., Houston, TX (US)

(72) Inventors: Michel Joseph Leblanc, Houston, TX (US); Jason Edward Therrien, Cypress, TX (US); Andreas Ellmauthaler, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 118 days.

(21) Appl. No.: 16/336,868

(22) PCT Filed: Jul. 31, 2018

(86) PCT No.: PCT/US2018/044693
§ 371 (c)(1),
(2) Date: Mar. 26, 2019

(87) PCT Pub. No.: WO2019/032339
PCT Pub. Date: Feb. 14, 2019

(65) Prior Publication Data
US 2020/0131900 A1    Apr. 30, 2020

Related U.S. Application Data

(60) Provisional application No. 62/543,339, filed on Aug. 9, 2017.

(51) Int. Cl.
*H04B 10/00* (2013.01)
*E21B 47/135* (2012.01)
(Continued)

(52) U.S. Cl.
CPC ............ *E21B 47/135* (2020.05); *E21B 49/00* (2013.01); *H04B 10/25* (2013.01); *H04B 10/61* (2013.01); *E21B 47/06* (2013.01); *E21B 47/07* (2020.05)

(58) Field of Classification Search
CPC ......................... H04B 10/071; E21B 47/135
See application file for complete search history.

(56) References Cited

U.S. PATENT DOCUMENTS

2006/0109451 A1   5/2006   Lopez Torres et al.
2008/0030730 A1   2/2008   Clark et al.
(Continued)

FOREIGN PATENT DOCUMENTS

GB      2546717 A  *  8/2017  ............. G01D 5/353
WO   2017009606      1/2017
WO   2019032340      2/2019

OTHER PUBLICATIONS

ISRWO International Search Report and Written Opinion for PCT/US2018/044693 dated Nov. 16, 2018.

*Primary Examiner* — Daniel G Dobson
(74) *Attorney, Agent, or Firm* — John Wustenberg; C. Tumey Law Group PLLC (57) ABSTRACT

The subject technology relates to an in-line amplifier assembly for distributed sensing system. The subject technology includes deploying a distributed sensing tool into a wellbore, and logging the wellbore using the distributed sensing tool. The distributed sensing tool includes a first optical amplifier and a first optical filter coupled to a first single-mode optical fiber. The first optical amplifier is coupled to a first single-mode circulator for amplifying a single-mode optical signal, and the first optical filter is coupled to the first optical amplifier for filtering the amplified single-mode optical signal. The first single-mode circulator is coupleable to an interrogator for routing the single-mode optical signal to a (Continued)

second single-mode optical fiber and routing a reflective optical signal from a second single-mode optical fiber to the interrogator. The reflective optical signal may traverse a second optical amplifier and a second optical fiber between the first and second single-mode circulators.

21 Claims, 5 Drawing Sheets

(51) Int. Cl.
*E21B 49/00* (2006.01)
*H04B 10/61* (2013.01)
*H04B 10/25* (2013.01)
*H04J 14/00* (2006.01)
*E21B 47/06* (2012.01)
*E21B 47/07* (2012.01)

(56) References Cited

U.S. PATENT DOCUMENTS

| | | |
|---|---|---|
| 2015/0323455 A1 | 11/2015 | Handerek |
| 2015/0377656 A1 | 12/2015 | Bastianini |
| 2018/0284304 A1 | 10/2018 | Barfoot et al. |

* cited by examiner

IN-LINE AMPLIFIER ASSEMBLY FOR DISTRIBUTED SENSING SYSTEM

CROSS-REFERENCE TO RELATED APPLICATIONS

The present application claims the benefit of priority under 35 U.S.C. § 119 from U.S. Provisional Patent Application Ser. No. 62/543,339 entitled "IN-LINE AMPLIFIER ASSEMBLY FOR DISTRIBUTED ACOUSTIC SENSING SYSTEM," filed on Aug. 9, 2017, the disclosure of which is hereby incorporated by reference in its entirety for all purposes.

TECHNICAL FIELD

The present disclosure relates to distributed sensing logging measurement systems, and more particularly to in-line amplifier assembly for distributed sensing system.

BACKGROUND

Distributed sensing technology may be suitable for various downhole applications ranging from temperature sensing to passive seismic monitoring. For example, a distributed sensing system may include an interrogation device positioned at a surface proximate to a wellbore and coupled to an optical sensing optical fiber extending from the surface into the wellbore. An optical source of the interrogation device may transmit an optical signal, or an interrogation signal, downhole into the wellbore through the optical sensing optical fiber. Reflections of the optical signal can propagate back toward an optical receiver in the interrogation device and the reflections can be analyzed to determine a condition in the wellbore.

BRIEF DESCRIPTION OF THE DRAWINGS

The following figures are included to illustrate certain aspects of the implementations, and should not be viewed as exclusive implementations. The subject matter disclosed is capable of considerable modifications, alterations, combinations, and equivalents in form and function, as will occur to those skilled in the art and having the benefit of this disclosure.

DETAILED DESCRIPTION

The present disclosure provides for a means to improve signal-to-noise ratio of a distributed sensing ("DS") system by amplifying the light of the light going to and/or received from a distal section of a sensing optical fiber. An optical amplifier is placed in line with the sensing optical fiber and extends the range of the DS system where the signal is limited by attenuation along the sensing optical fiber. In other words, the subject technology provides for a convenient and efficient way to extend the range of a single-mode fiber ("SMF") DS interrogation system where attenuation would otherwise restrict the range. In some aspects, the optical amplifier is placed in-line with the sensing optical fiber such as anywhere along its length but preferably after some loss has occurred so that the total range is extended. In other aspects, the optical amplifier can be of a SMF design, to be used with a SMF sensing optical fiber, or a of multi-mode fiber (MMF) design, to be used with a MMF sensing optical fiber. In one or more implementations, the apparatus is compatible with multi-wavelength DS systems.

The subject technology provides several advantages over traditional acoustic sensing logging systems. For example, the subject system allows the use of DS in a customer set-up that has optical fibers with relatively high attenuation. The subject system also permits connection of dissimilar optical fiber types and compensates for non-uniformity of the backscatter signals among the optical fiber types. The subject system also can compensate for lossy splices and connectors.

The subject technology relates to an in-line amplifier assembly for distributed sensing system. For example, the subject technology includes deploying a distributed sensing tool into a wellbore penetrating a subterranean formation, and logging the wellbore using the distributed sensing tool (e.g., a distributed acoustic sensing ("DAS") tool). The distributed sensing tool includes a first optical amplifier and a first optical filter coupled to a first single-mode optical fiber. The first optical amplifier is coupled to a first single-mode circulator for amplifying a single-mode optical signal, and the first optical filter is coupled to the first optical amplifier for filtering the amplified single-mode optical signal. The first single-mode circulator is coupleable to an interrogator for routing the single-mode optical signal from the interrogator to a second single-mode optical fiber and routing a reflective optical signal from the second single-mode optical fiber to the interrogator. The reflective optical signal may traverse a second optical amplifier and a second optical fiber between the first and second single-mode circulators.

As used herein, the terms "single-mode fiber" and "SMF" are interchangeable with the term "single-mode optical fiber," and the terms "multi-mode fiber" and "MMF" are interchangeable with the term "multi-mode optical fiber," without departing from the scope of the present disclosure.

Figure 1:
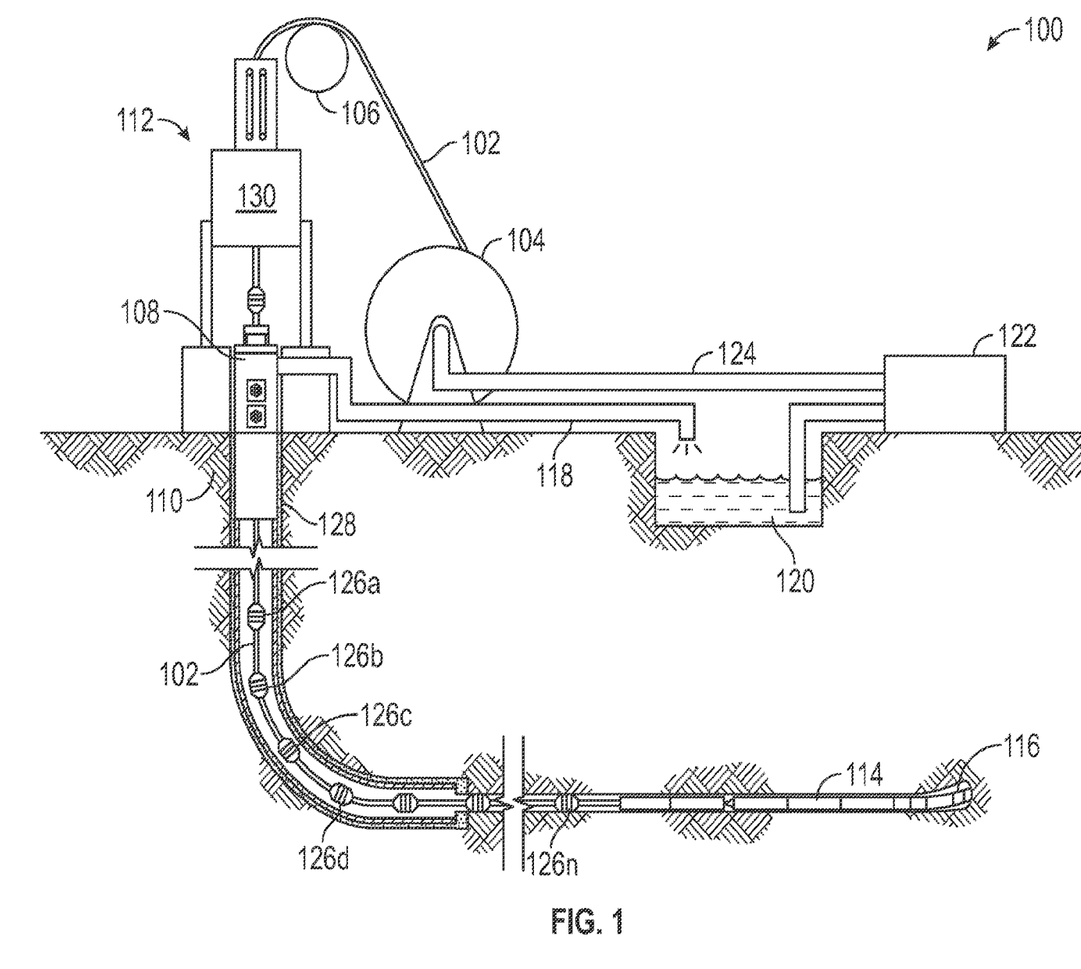
FIG. 1 illustrates an exemplary well monitoring and measurement system that may employ the principles of the present disclosure in accordance with one or more implementations.

FIG. 1 illustrates an exemplary well monitoring and measurement system 100 that may employ the principles of the present disclosure in accordance with one or more implementations. It may be noted that the well monitoring and measurement system 100 can be used in a land-based operation as well as in any sea-based or sub-sea application including a floating platform or sub-surface wellhead installation, as generally known in the art. The well monitoring and measurement system 100 can also include additional or different features that are not shown in FIG. 1. For example, the well monitoring and measurement system 100 can include additional wireline logging system components, production system components, completion system components, or other components. In the present disclosure, distributed sensing systems may be permanently installed and connected to a sensing fiber with the objective of monitoring production and flow rates over time.

Horizontal drilling techniques for forming a wellbore often include vertically drilling from a surface location to a desired subterranean depth, from which point, drilling is curved or at a sub-terrain plane approximately horizontal to the surface to connect the wellbore to multiple hydrocarbon deposits.

As illustrated, the well monitoring and measurement system 100 may include a service rig 112 that is positioned on the earth's surface 136 and extends over and around a wellbore 128 that penetrates a subterranean formation 110. The service rig 103 may be a drilling rig, a completion rig, a workover rig, a production rig, or the like. In some embodiments, the service rig 103 may be omitted and replaced with a standard surface wellhead completion or installation, without departing from the scope of the disclosure. Moreover, while the well monitoring and measurement system 100 is depicted as a land-based operation, it will be appreciated that the principles of the present disclosure could equally be applied in any sea-based or sub-sea application where the service rig 103 may be a floating platform, a semi-submersible platform, or a sub-surface wellhead installation as generally known in the art.

The wellbore 128 may be drilled into the subterranean formation 110 using any suitable drilling technique and may extend in a substantially vertical direction away from the earth's surface 136 over a vertical wellbore portion. At some point in the wellbore 128, the vertical wellbore portion may deviate from vertical relative to the earth's surface 136 and transition into a substantially horizontal portion. In other embodiments, however, the casing string may be omitted from all or a portion of the wellbore 128 and the principles of the present disclosure may equally apply to an "openhole" environment.

As illustrated in FIG. 1, the well monitoring and measurement system 100 includes a tubing system 102, which is placed on a reel 104. The tubing system 102 passes over a guide arch 106, commonly referred to in the oil and gas industry as a "gooseneck," and is directed downhole through an injector head 108 into a subterranean formation 110. The guide arch 106 may include a rigid structure that exhibits a known radius. As the tubing system 102 is conveyed through the guide arch 106, the tubing system 102 may be plastically deformed and otherwise re-shaped and re-directed for receipt by the injector head 108 located therebelow.

During a tubing operation, the tubing system 102 is fed off the reel 104 over the injector head 108 into a wellbore 128. In some implementations, for example, the injector head 108 may include a plurality of internal gripping elements or wheels (not shown) configured to engage the outer surface of the tubing system 102 to either pull the tubing system 102 from the reel 108, or retract the tubing system 102 from the wellbore 128 to be wound again on the reel 104. In some implementations, however, the injector head 108 may be omitted and the weight of the tubing system 102 may instead be used for deployment and the reel 104 may be motorized to retract the tubing system 102.

Fluid may be delivered to a bottom hole assembly 114 and a downhole tool 116 through the tubing system 102. The fluid may then be returned to the surface 136 through the annulus between the wellbore wall (or casing if the wellbore 128 is cased) and the tubing system 102. The returned fluid may be directed to a returned fluid pipe 118 and delivered to a mud pit 120. A recirculation pump 122 may then recirculate the fluid through the pipe 124 to the tubing system 102.

The tubing system 102 may be, but is not limited to, coiled tubing, intelligent coiled tubing, hybrid coiled tubing, or the like. The term "coiled tubing" normally connotes a relatively small diameter continuous tubing string that can be transported to a well site on a drum or in a reel (e.g., 104).

As oil and gas exploration technology continues to improve the demand for better wellbore information grows and there has been more interest in using coiled tubing to deploy more instrumentation into the wellbore 128, particularly pressure and temperature sensors.

In some implementations, the tubing system 102 may comprise a conduit or umbilical used to convey fluids or power to a subsea location (not shown), such as a wellhead, a submerged platform, or a subsea pipeline. The tubing system 102 may be made of a variety of deformable materials including, but not limited to, a steel alloy, stainless steel, titanium, other suitable metal-based materials, thermoplastics, composite materials (e.g., carbon fiber-based materials), and any combination thereof. The tubing system 102 may exhibit a diameter of about 3.5 inches, but may alternatively exhibit a diameter that is greater or less than 3.5 inches, without departing from the scope of the disclosure.

As illustrated, the well monitoring and measurement system 100 may include a plurality of distributed sensors and devices (e.g., 126a-n), each communicably coupled to a data acquisition system 130 configured to receive and process signals deriving from each sensor and/or device. The data acquisition system 130 may be a computer system, for example, that includes a memory, a processor, and computer readable instructions that, when executed by the processor, process the sensor signals. As illustrated, the data acquisition system 130 is communicably coupled to the tubing system 102 and housed in a feeding guide component of the service rig 112. The data acquisition system 130 may be communicably coupled to the tubing system 102 and located in a different section of the service rig 112 from that shown in FIG. 1 without departing from the scope of the present disclosure.

A typical fiber telemetry system inside coiled tubing can consist of at least three fiber optic pressure transducers, one at the heel, one at the toe and one in the middle of the horizontal portion, along with additional fiber for DTS (Distributed Temperature Sensing) and/or DAS (Distributed Acoustic Sensing) telemetry. Each sensor may have single or multiple fibers. Although the number of fibers can vary, the examples given in this disclosure will demonstrate the deployment of optical fibers for DTS and/or DAS telemetry to cover wireline, tubing, casing, and coiled tubing (including intelligent, hybrid systems).

The distributed sensors, having e.g., optical fiber, can be pulled and/or pumped into coiled tubing (see e.g., FIG. 2D) for retrievability. The tubing system 102 can also include various electrical sensors, including point thermocouples for temperature sensing as well as DTS system calibration. The DTS and/or DAS fibers can be deployed on a wireline (see FIG. 2A) for retrievability, or pumped into a conduit after installation. The fiber for the DTS can be pumped into a double-ended conduit for some coiled tubing deployments. The location of the sensors can be carefully measured before they are pulled into the coiled tubing. The exact location can then be identified using e.g. x-ray systems and/or ultrasonic systems and/or DAS systems by tapping on the coiled tubing and/or by DTS systems and apply a thermal event or other similar methods where distance can be verified and compared with distances measured before a sensing string is pulled into the coiled tubing. Penetrations can then be drilled though the coiled tubing at suitable locations, and suitable seals can be applied to/activated on the assembly. All of the installation of the sensor systems into the tubing is done in the coiled tubing before the tubing is deployed downhole.

In some implementations, the distributed sensors may comprise distributed acoustic sensors, which may also use optical fibers and permit a distributed measurement of local acoustics at any given point along the fiber. Additionally or alternatively, in an example (not explicitly illustrated), the distributed sensors may be permanently attached to or embedded within the one or more strings of casing lining the wellbore 128 (see FIG. 2C), to the one or more strings of tubing positioned downhole within the casing (see FIG. 2B), and/or the wall of the wellbore 128 at an axially spaced pre-determined distance. The optical fiber may include single-mode fiber, multi-mode fiber, or a combination thereof. The distributed acoustic sensors may be configured to operate as DAS subsystem and/or a DTS subsystem. The distributed sensing system may work using Rayleigh backscattering (e.g, DAS), or Brillouin (e.g., Distributed Temperature Sensing, or Distributed Strain Sensing), or Raman (Distributed Temperature Sensing).

FIGS. 2A-2D illustrate examples of distributed sensing deployment options that can employ the principles of the present disclosure in accordance with one or more implementations. Wellbores for use in oil and gas exploration and production are often drilled in stages where a first stage is drilled and lined with a casing (e.g., surface casing 201), then a second, smaller diameter stage is drilled and lined with a casing (e.g., production casing 202), and so on. In some implementations, the wellbore 128 may be completed by cementing a casing string within the wellbore 128 along all or a portion thereof. Once drilling of the wellbore (e.g., 128) is finished, the wellbore completion operations are then undertaken. Completion operations generally refer to the events necessary to bring a wellbore into production once drilling operations have concluded.

Figure 2A:
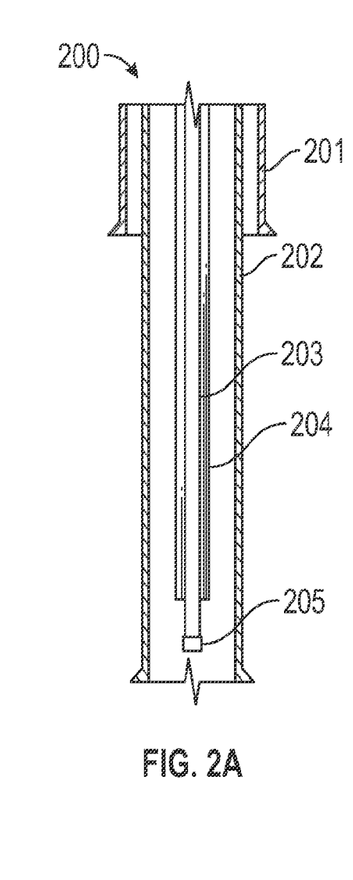
FIGS. 2A-2D illustrate examples of distributed sensing deployment options that can employ the principles of the present disclosure in accordance with one or more implementations.

In FIG. 2A, a wireline assembly 200 includes a tubing 204 deployed into a wellbore (e.g., 128) and routed through the production casing 202. A wireline cable (e.g., cable 203) housing optical fibers may be routed through the tubing 204, and later retrievable from the wellbore 128. In some aspects, the optical fibers are coupled to a wireline cable (e.g., cable 203). The optical fibers can be coupled to the wireline such that the optical fibers are removable with the wireline. The cable 203 can include multiple optical fibers. For example, the optical fibers can include one or more single-mode optical fibers and one or more multi-mode optical fibers. Each of the optical fibers may include one or more optical sensors along the optical fibers. The optical sensors may be deployed in the wellbore 128 and used to sense and transmit measurements of downhole conditions in the wellbore 128 to the earth's surface (e.g., 136). A bottom hole gauge carrier 205 is coupled to a distal end of the cable 203 for taking measurements at the toe end of the lateral wellbore. In some aspects, the bottom hole gauge carrier 205 includes a pressure/temperature gauge for measuring pressure and/or temperature.

In some implementations, Single-Mode Fiber (SMF) may be used for both DAS/DTS, or Multi-Mode Fiber (MMF) may be used for both DAS/DTS depending on implementation. In some implementations, double-clad-dual-core fiber may be employed while using e.g., SMF for DAS on the inner core and MMF DTS on the outer core without departing from the scope of the present disclosure.

Figure 2B:
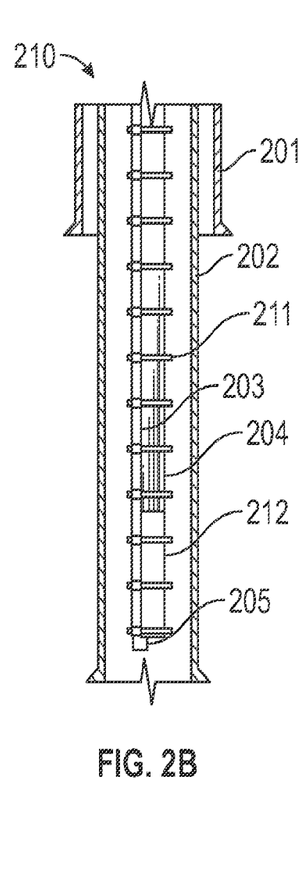

In FIG. 2B, a tubing assembly 210 includes the tubing 204 deployed into the wellbore (e.g., 128) and routed through the production casing 202. The cable 203 may be routed through the tubing 204 and permanently installed along an outer surface of the tubing 204. The optical fibers housed in the cable 203 may be retained against the outer surface of the tubing 204 at intervals (e.g., every other joint) by coupling bands (e.g., cross-coupling protectors 211) that extend around the tubing 204. In some aspects, a tubing tail 212 can be extended below a bottom perforation.

Figure 2C:
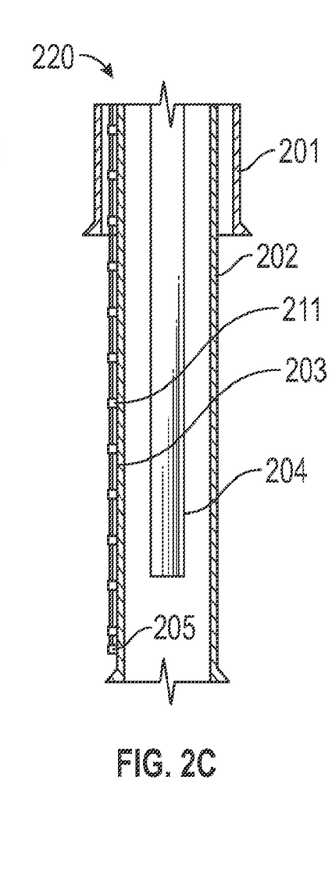

In FIG. 2C, a casing assembly 220 includes a tubing 204 deployed into the wellbore (e.g., 128) and routed through the production casing 202. The cable 203 may be routed through the surface casing 201 and permanently installed along an outer surface of the production casing 202. The optical fibers housed in the cable 203 may be retained against the outer surface of the production casing 202 at intervals (e.g., every other joint) by coupling bands (e.g., cross-coupling protectors 211) that extend around the production casing 202.

Figure 2D:
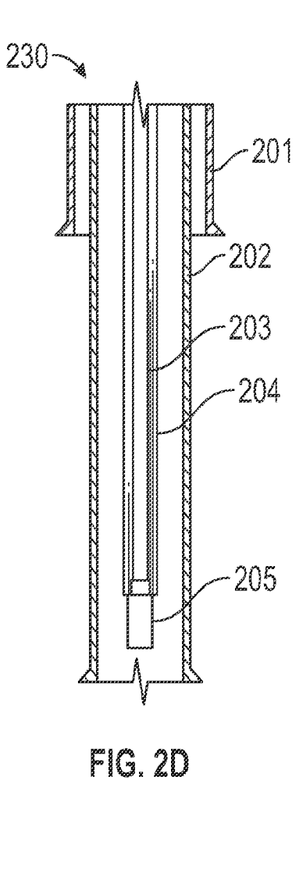

In FIG. 2D, a coiled tubing assembly 230 includes a tubing 204, such as a coiled tubing system, deployed into a wellbore (e.g., 128) and routed through the production casing 202. A cable 203 housing optical fibers may be coupled to an outer surface of the tubing 204. In some aspects, the optical fibers are coupled to the cable 203. The optical fibers can be non-permanently coupled to the cable 203 such that the optical fibers are removable with the cable 203. The cable 203 can include multiple optical fibers. For example, the optical fibers can include one or more single-mode optical fibers and one or more multi-mode optical fibers. Each of the optical fibers may include one or more optical sensors along the optical fibers. The optical sensors may be deployed in the wellbore 128 and used to sense and transmit measurements of downhole conditions in the wellbore 128 to the earth's surface (e.g., 136). A bottom hole gauge carrier 205 is routed through the tubing 204 beyond a distal end of the cable 203 to a bottom hole assembly module (e.g., 114) for taking measurements at the toe end of the lateral wellbore, and later retrievable from the wellbore 128 through the tubing 204. In some aspects, the bottom hole gauge carrier 205 includes a pressure/temperature gauge for measuring pressure and/or temperature.

The cable 203 may be configured for optical fiber sensing to obtain point or distributed optical fiber measurements. As used herein, "distributed optical fiber sensing" refers to the ability to obtain well parameter measurements along the entire length of an optical fiber, but also refers to the ability to obtain point measurements from point reflectors (e.g., Fiber Bragg Gratings, etc.) included at predetermined locations along the optical fiber(s). The optical fibers in the cable 203 may be used as distributed acoustic sensors and/or distributed temperature sensors. In an example, one or more optical fibers may be used for one or more of DAS or DTS.

A number of distributed sensing methodologies may be used to determine the well parameters of interest, without departing from the scope of the present disclosure. When electromagnetic radiation is transmitted through an optical fiber, a portion of the electromagnetic radiation will be backscattered in the optical fiber by impurities of the optical fiber, areas of different refractive index in the fiber generated in the process of fabricating the fiber, interactions with the surfaces of the optical fiber, and/or connections between the fiber and other optical fibers or components. Some of the backscattered electromagnetic radiation is treated as unwanted noise and steps may be taken to reduce such backscattering.

Figure 3:
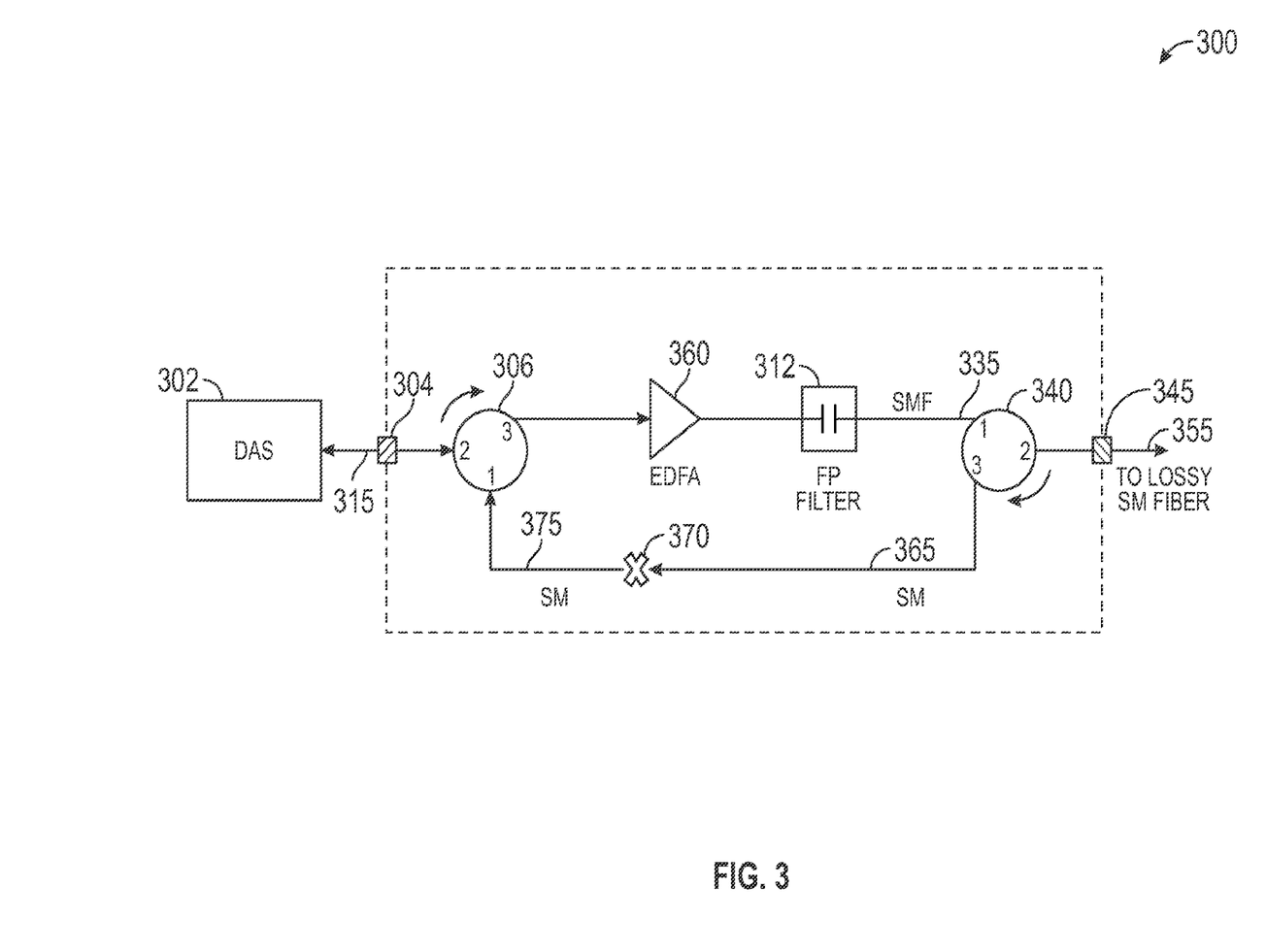
FIG. 3 illustrates an example of an in-line amplifier assembly for distributed acoustic sensor system.

FIG. 3 is a schematic diagram of an example of a distributed sensing system 300 according to one aspect of the present disclosure. The distributed sensing system 300 includes a distributed sensing (DS) interrogator 302. In some aspects, the DS interrogator 302 of FIG. 2 represents one configuration of the computing subsystem 118 and the cable 203 of FIGS. 2A-2D, but other configurations are possible. For example, the components of the distributed sensing system 300 may be arranged in a different order or configuration without departing from the scope of the present disclosure. Similarly, one or more components may be added to or subtracted from the configuration of the distributed sensing system 300 shown in FIG. 3 without departing from the scope of the present disclosure.

The DS interrogator 302 is connected to a SMF lead, which is connected to the "DAS" side of the assembly using a high power fiber connector 304. Laser pulses launched from the DS interrogator 302 are fed to a bi-directional port of a first SMF circulator 306 at port 2, which is connected at port 3 to an optical amplifier 360, which amplifies the light and feeds it to an optical filter 312. The optical filter 312 removes the amplified spontaneous emission (ASE) noise from the optical amplifier 360. The output of the optical filter 312 is connected to port 1 of a second single-mode circulator 340, which guides the light to port 2 (a bi-directional port) to a distributed sensing optical fiber 355. The backscatter from the distributed sensing optical fiber 355 is fed via the second single-mode circulator 340 to port 3 of the second single-mode circulator 340, which is connected to a SMF 375 via a single-mode splice 370 leading to port 1 of the single-mode circulator 306, which guides the light to port 2 of the single-mode circulator 306 back towards the DS interrogator 302.

The distributed sensing interrogator 302 may be positioned at a surface of a wellbore and the DS interrogator 302 may include an optical source (not shown). The optical source may include a laser and a pulse generator. The laser can emit optical signals that can be manipulated by the pulse generator. In some aspects, the pulse generator may include one or more amplifiers, oscillators, or other suitable components to manipulate the optical signals emitted by the laser to generate pulses of optical signals at a controlled time duration. The pulses of the optical signals from the pulse generator may be transmitted to a single-mode optical fiber 315. The single-mode optical fiber 315 can include one or more optical fibers that propagate, or carry, optical signals in a direction that is parallel to the fiber (e.g., a traverse mode). In some aspects, the single-mode optical fiber 315 may route optical signals having a wavelength in the range of 1300 nanometers to 1600 nanometers. In additional or alternative aspects, the single-mode optical fiber 315 may include a core diameter between 8 and 10 microns.

The single-mode circulator 306 can be a three-port single-mode circulator 306 including ports 1 to 3. The single-mode circulator 306 may include one or more isolation components to isolate the input of the optical signals at each of the ports 1 to 3. Port 1 is communicatively coupled to the output (or Port 3) of the second single-mode circulator 340 by a second multi-mode optical fiber 375 via the single-mode splice 370 for receiving the reflective optical signal from the second single-mode circulator 340.

The single-mode circulator 306 may route the reflective optical signal from port 1 to port 2. Port 2 is communicatively coupled to the DS interrogator 302. Port 2 may receive the single-mode optical signal from the distributed sensing interrogator 302. Port 2 may route the single-mode optical signal to port 3. The unilateral nature of the single-mode circulator 306 can prevent the input single-mode optical signal from traversing toward the second single-mode circulator 340.

The optical amplifier 360 can include an erbium-doped fiber amplifier ("EDFA") that may amplify a received optical signal without first converting the optical signal to an electrical signal. For example, an EDFA may include a core of a silica fiber that is doped with erbium ions to cause the wavelength of a received optical signal to experience a gain to amplify the intensity of an outputted optical signal. Although only one optical amplifier 360 is shown in FIG. 2, the optical amplifier 360 may represent multiple amplifiers without departing from the scope of the present disclosure. In some implementations, the optical filter 312 is a Fabry-Perot (FP) filter. In some aspects, the optical filter 312 represents a notch filter that attenuates signals within a specified narrow frequency range.

The single-mode circulator 340 can be a three-port single-mode circulator 340 including ports 1 to 3. The single-mode circulator 340 may include one or more isolation components to isolate the input of the optical signals at each of the ports 1 to 3. Port 1 is communicatively coupled to the output of the optical filter 312 by the second multi-mode optical fiber 335. The second single-mode circulator 340 may route the amplified single-mode optical signal from port 1 to port 2. Port 2 is communicatively coupled to the distributed sensing optical fiber 355, which can be positioned in the wellbore 114. The single-mode optical signals can be output from port 2 to the distributed sensing optical fiber 355 via a single-mode fiber connector 345 to interrogate downhole optical sensors coupled to the distributed sensing optical fiber 355. Port 2 may receive reflective single-mode optical signals. The reflective single-mode optical signals may correspond to reflections of the single-mode optical signals transmitted through the distributed sensing optical fiber 355. For example, the single-mode optical signals may be routed by the distributed sensing optical fiber 355 to the downhole sensors and reflected back through the distributed sensing optical fiber 355 to port 2. Port 2 may route the reflected single-mode optical signals to port 3. The unilateral nature of the second single-mode circulator 340 can prevent the reflected light from the downhole sensors from reflecting back toward the distributed sensing optical fiber 355. Port 3 of the second single-mode circulator 340 can be coupled to a single-mode optical fiber 365. The single-mode optical fiber 365 can be coupled to a single-mode optical fiber 375 by the single-mode splice 370.

The distributed sensing optical fiber 355 can include one or more multi-mode optical fibers that can propagate optical signals in more than one mode. In some aspects, the distributed sensing optical fiber 355 can route optical signals having a wavelength of 850 nanometers to 1300 nanometers. In additional or alternative aspects, the core diameter of a multi-mode optical fiber (e.g., 50 microns to 100 microns) may be larger than the core diameter of a single-mode optical fiber. A larger core diameter can allow a multi-mode optical fiber to support multiple propagation modes.

In some aspects, with proper adjustment of the optical amplifier gain (set via the optical amplifier pump laser current), the backscatter return signal can be made to be at a level sufficient for its use by the DS interrogator 302.

The approach illustrated in FIG. 3 can be especially useful when the second optical fiber (e.g., the distributed sensing optical fiber 355) has high attenuation, or when an optical fiber with a low backscatter coefficient needs to be connected in line with a relatively high backscatter coefficient. The optical amplifier 360 permits to adjust the single-mode optical signal of the second optical fiber (e.g., the distributed sensing optical fiber 355) to match that of the first optical fiber (e.g., single-mode optical fiber 315).

Another example of a distributed sensing system 300 that uses two optical amplifiers and two optical filters to accomplish the same task is presented in FIG. 3. The first optical amplifier 360 (e.g., booster EDFA) amplifies the pulses of light before they are launched into the second optical fiber (e.g., the distributed sensing optical fiber 355). The second optical amplifier 365 (e.g., pre-AMP EDFA) is used to amplify the backscatter return signal from the second sensing optical fiber before it is sent back to the DS interrogator 302 via the first sensing optical fiber (e.g. 315).

Figure 4:
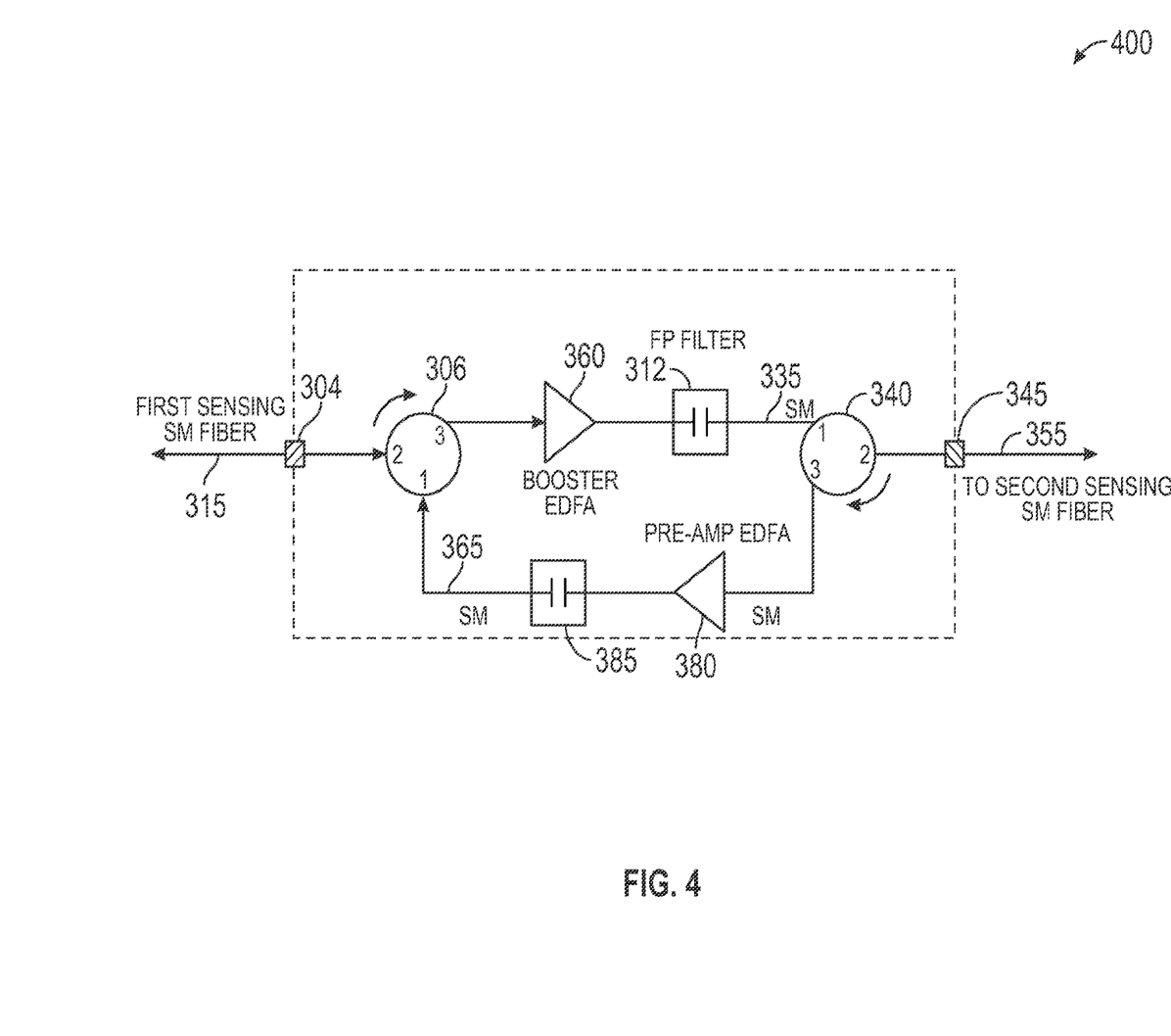
FIG. 4 illustrates another example of an in-line amplifier assembly for distributed acoustic sensor system.

In FIG. 4, laser pulses are launched from the DS interrogator 302 are fed to a bi-directional port of the first SMF circulator 306 at port 2, which is connected at port 3 to the optical amplifier 360, which amplifies the light and feeds it to the optical filter 312. The output of the optical filter 312 is connected to port 1 of the second single-mode circulator 340, which guides the light to port 2 (a bi-directional port) to a distributed sensing optical fiber 355. The backscatter from the distributed sensing optical fiber 355 is fed via the second single-mode circulator 340 to port 3 of the second single-mode circulator 340, which is connected to a second optical amplifier 380. The second optical amplifier 380 amplifies the backscatter return signal, which is then fed to a second optical filter 385. The second optical filter 385 filters out any additional amplification noise from the backscatter return signal. The backscatter return signal is then led to port 1 of the single-mode circulator 306, which guides the light to port 2 of the single-mode circulator 306 back towards the DS interrogator 302.

The first optical amplifier 360 (e.g., booster EDFA) amplifies the pulses of light before they are launched into the second optical fiber (e.g., the distributed sensing optical fiber 355). The second optical amplifier 365 (e.g., pre-AMP EDFA) is used to amplify the backscatter return signal from the second sensing optical fiber before it is sent back to the DS interrogator 302 via the first sensing optical fiber.

In some implementations, MMF components may be substituted for SMF components. Such versions may be designed to extend the range of MMF sensing fiber cables used with a MMF DS interrogator or equivalent. Variants of the same systems (both SMF and MMF) without the FP filters, or with only one FP filter (either on launch or receive path) can also be used. The in-line amplifier assembly 300 may be standalone devices that are placed in-line along the sensing optical fiber. They can be cascaded so that several are placed along the length of the sensing cable, with sections of the sensing fiber between them.

Figure 5:
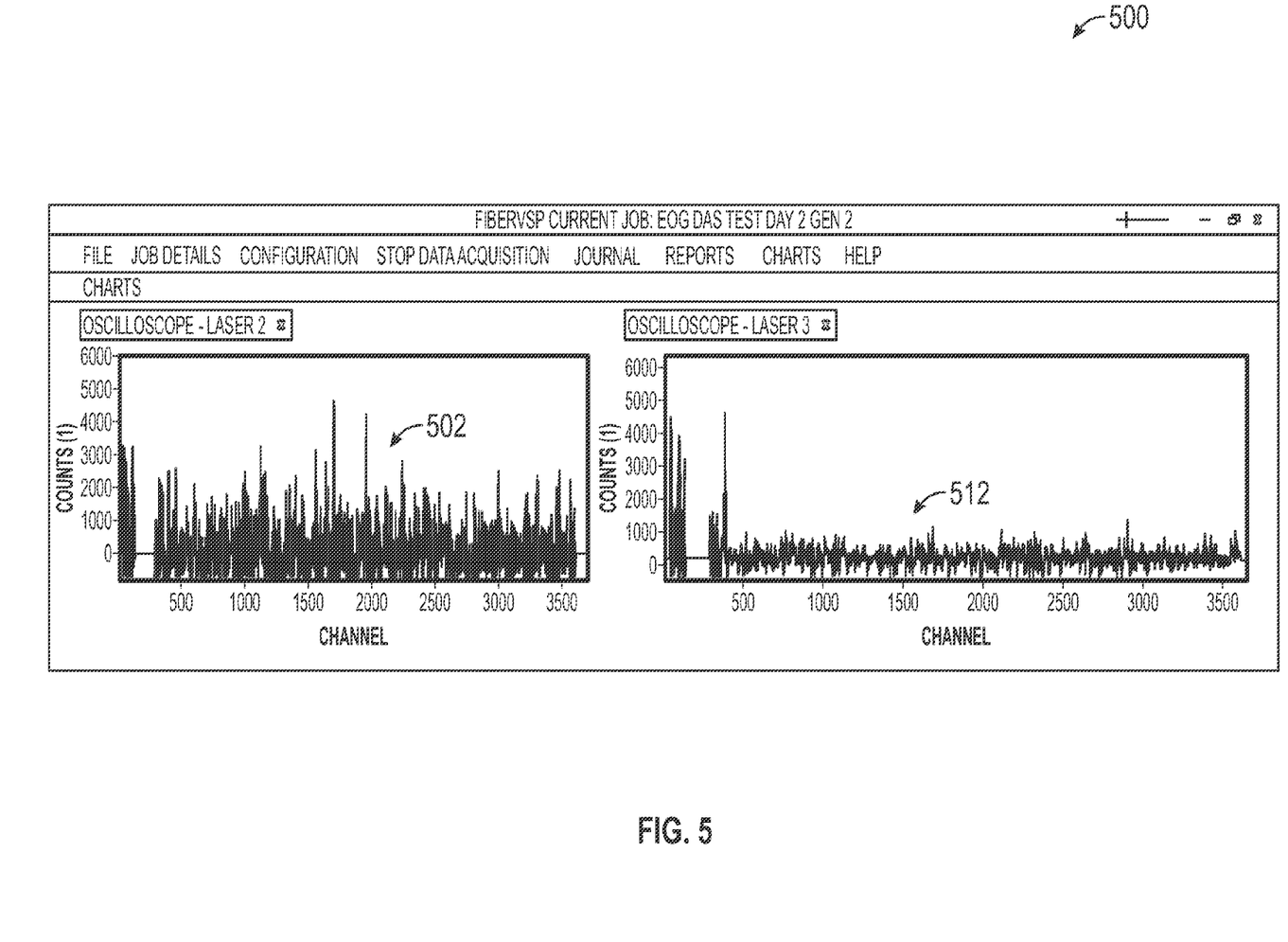
FIG. 5 illustrates an example of a backscatter waveform based on single-mode fiber and multi-mode fiber.

FIG. 5 illustrates an example of a backscatter waveform 500 using single-mode fiber and multi-mode fiber. The backscatter signal can be measured with the DS interrogator 302. The waveform 502 is representative of adequate gain in the first optical amplifier 360 to make the signal from the second sensing optical fiber (e.g., 355) match that of the first sensing optical fiber (e.g., 315). The waveform 512 is indicative of insufficient gain such that the signal strength of the optical signal from second sensing optical fiber would not match that of the first sensing optical fiber. Both the first optical amplifier 360 pump current and the second optical amplifier 380 pump current can be adjusted to modify the gain of the single-mode optical signal.

Various examples of aspects of the disclosure are described below. These are provided as examples, and do not limit the subject technology.

A system includes a single-mode circulator coupleable to a distributed sensing interrogator for routing a single-mode optical signal from the distributed sensing interrogator through a first single-mode optical fiber to a second single-mode optical fiber positionable along a region to be sensed and communicatively coupleable to an optical receiver of the distributed sensing interrogator for routing a reflective optical signal received from the second single-mode optical fiber to the optical receiver; an optical amplifier coupled to the single-mode circulator for amplifying the single-mode optical signal; and an optical filter coupled to the optical amplifier for filtering one or more noise components from the amplified single-mode optical signal and routing the filtered single-mode optical signal to the second single-mode optical fiber; and a second single-mode circulator coupleable to a second single-mode optical fiber positionable downhole in the wellbore for routing the single-mode optical signal from the single-mode optical fiber to the second single-mode optical fiber and communicatively coupleable to the first single-mode circulator for routing the reflective optical signal received from the second single-mode optical fiber to the first single-mode circulator.

A method is provided that includes routing, by a first single-mode circulator communicatively coupled to a distributed sensing interrogator, a single-mode optical signal through a first single-mode optical fiber positioned along a region to be sensed; amplifying, by an optical amplifier coupled to the first single-mode circulator, the single-mode optical signal by a predetermined gain; filtering, by an optical filter coupled to the optical amplifier, the amplified single-mode optical signal to remove one or more noise components from the amplified single-mode optical signal; receiving, by a second single-mode circulator coupled to the optical filter, a reflective optical signal on a second single-mode optical fiber positioned in the region to be sensed in response to routing the filtered single-mode optical signal; and routing, by the second single-mode circulator, the reflective optical signal to the first single-mode circulator.

A system includes a distributed sensing interrogator; a distributed sensing optical fiber amplifier; and a distributed sensing subsystem positionable downhole in a region to be sensed and that includes a single-mode optical fiber as a communication medium for an interrogation optical signal and a reflective optical signal, wherein the distributed sensing optical fiber amplifier comprises: a first single-mode circulator coupleable to a distributed sensing interrogator for routing a single-mode optical signal from the distributed sensing interrogator through a first single-mode optical fiber to a second single-mode optical fiber positionable downhole in a region to be sensed and communicatively coupleable to an optical receiver of the distributed sensing interrogator for routing a reflective optical signal received from the second single-mode optical fiber to the optical receiver; an optical amplifier coupled to the single-mode circulator for amplifying the single-mode optical signal; an optical filter coupled to the optical amplifier for filtering one or more noise components from the amplified single-mode optical signal and routing the filtered single-mode optical signal to the second single-mode optical fiber; and a second single-mode circulator coupleable to a second single-mode optical fiber positionable downhole in the region to be sensed for routing the single-mode optical signal from the single-mode optical fiber to the second single-mode optical fiber and communicatively coupleable to the first single-mode circulator for routing the reflective optical signal received from the second single-mode optical fiber to the first single-mode circulator.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A system, comprising:
 a first single-mode circulator coupleable to a distributed sensing interrogator for routing a single-mode optical signal from the distributed sensing interrogator through a first single-mode optical fiber to a second single-mode optical fiber positionable downhole in a region to be sensed and communicatively coupleable to an optical receiver of the distributed sensing interrogator for routing a reflective optical signal received from the second single-mode optical fiber to the optical receiver; and
 an optical amplifier coupled to the single-mode circulator for amplifying the single-mode optical signal, wherein the optical amplifier amplifies the single-mode optical signal by a predetermined gain based at least in part on a signal intensity of the reflective optical signal.

2. The system of claim 1, further comprising:
 an optical filter coupled to the optical amplifier for filtering one or more noise components from the amplified single-mode optical signal and routing the filtered single-mode optical signal to the second single-mode optical fiber.

3. The system of claim 1, further comprising:
 a second single-mode circulator coupleable to a second single-mode optical fiber positionable in the region to be sensed for routing the single-mode optical signal from the single-mode optical fiber to the second single-mode optical fiber and communicatively coupleable to the first single-mode circulator for routing the reflective optical signal received from the second single-mode optical fiber to the first single-mode circulator.

4. The system of claim 1, wherein the first single-mode circulator comprises:
 a first port coupled to an optical splice for receiving the reflective optical signal from the second single-mode circulator;
 a second port communicatively coupleable to the distributed sensing interrogator for receiving the single-mode optical signal from the distributed sensing interrogator; and
 a third port coupled to the optical amplifier for routing the single-mode optical signal to the optical amplifier.

5. The system of claim 1, wherein the single-mode optical signal and the reflective optical signal have a same signal intensity.

6. The system of claim 1, further comprising an optical splice coupled along a return path between the first single-mode circulator and a second single-mode circulator.

7. The system of claim 6, wherein the second single-mode circulator comprises:
 a first port coupled to the optical filter for receiving the filtered single-mode optical signal;
 a second port coupled to the second single-mode optical fiber for routing the filtered single-mode optical signal to the second single-mode optical fiber; and
 a third port communicatively coupleable to an optical splice for receiving the reflective optical signal from the second single-mode optical fiber and routing the reflective optical signal to the optical splice.

8. The system of claim 6, further comprising:
 a second optical amplifier coupled to the second single-mode circulator for amplifying the reflective optical signal.

9. The system of claim 8, further comprising:
 a second optical filter coupled to the second optical amplifier for filtering one or more noise components from the amplified reflective optical signal and routing the filtered reflective optical signal to the first single-mode optical fiber.

10. A method, comprising:
 routing, by a first single-mode circulator communicatively coupled to a distributed sensing interrogator, a single-mode optical signal through a first single-mode optical fiber positioned in a region to be sensed;
 amplifying, by an optical amplifier coupled to the first single-mode circulator, the single-mode optical signal by a predetermined gain based at least in part on a signal intensity of a reflective optical signal;
 filtering, by an optical filter coupled to the optical amplifier, the amplified single-mode optical signal to remove one or more noise components from the amplified single-mode optical signal;
 receiving, by a second single-mode circulator coupled to the optical filter, the reflective optical signal on a second single-mode optical fiber positioned in the region to be sensed in response to routing the filtered single-mode optical signal; and
 routing, by the second single-mode circulator, the reflective optical signal to the first single-mode circulator.

11. The method of claim 10, further comprising:
 receiving, by the first single-mode circulator, the reflective optical signal from the second single-mode circulator via a spliced single-mode optical fiber coupled to the second single-mode circulator.

12. The method of claim 10, wherein routing the single-mode optical signal through the first single-mode optical fiber comprises:
 receiving the single-mode optical signal at a second port communicatively coupled to a distributed sensing interrogator;
 routing the single-mode optical signal through a third port communicatively coupled to the optical amplifier via the first single-mode optical fiber; and
 receiving the reflective optical signal at a first port coupled to the second single-mode circulator via the first single-mode optical fiber spliced from the second single-mode optical fiber, wherein receiving the reflective optical signal comprises routing the reflective optical signal to the distributed sensing interrogator through the second port.

13. The method of claim 10, wherein routing the reflective optical signal to the first single-mode circulator comprises:
 receiving the filtered single-mode optical signal at a first port communicatively coupled to the optical filter;

routing the filtered single-mode optical signal to a second single-mode optical fiber through a second port; and routing the reflective optical signal through a third port communicatively coupled to the first single-mode circulator via the first single-mode optical fiber spliced from the second single-mode optical fiber, wherein routing the filtered single-mode optical signal comprises receiving the reflective optical signal at the second port communicatively coupled to the second single-mode optical fiber.

14. The method of claim 13, further comprising:

amplifying, by a second optical amplifier coupled to the second single-mode circulator, the reflective optical signal by a predetermined gain.

15. The method of claim 14, further comprising:

filtering, by a second optical filter coupled to the second optical amplifier, the amplified reflective optical signal to remove one or more noise components from the amplified reflective optical signal.

16. A system comprising:

a distributed sensing interrogator;

a distributed sensing optical fiber amplifier; and a distributed sensing subsystem positionable downhole in a region to be sensed and that includes a single-mode optical fiber as a communication medium for an interrogation optical signal and a reflective optical signal, wherein the distributed sensing optical fiber amplifier comprises:

a first single-mode circulator coupleable to a distributed sensing interrogator for routing a single-mode optical signal from the distributed sensing interrogator through a first single-mode optical fiber to a second single-mode optical fiber positionable downhole in a region to be sensed and communicatively coupleable to an optical receiver of the distributed sensing interrogator for routing a reflective optical signal received from the second single-mode optical fiber to the optical receiver;

an optical amplifier coupled to the first single-mode circulator for amplifying the single-mode optical signal by a predetermined gain based at least in part on a signal intensity of the reflective optical signal;

an optical filter coupled to the optical amplifier for filtering one or more noise components from the amplified single-mode optical signal and routing the filtered single-mode optical signal to the second single-mode optical fiber; and a second single-mode circulator coupleable to the second single-mode optical fiber for routing the single-mode optical signal from the single-mode optical fiber to the second single-mode optical fiber and communicatively coupleable to the first single-mode circulator for routing the reflective optical signal received from the second single-mode optical fiber to the first single-mode circulator.

17. The system of claim 16, wherein the first single-mode circulator comprises:

a first port coupled to an optical splice for receiving the reflective optical signal from the second single-mode circulator;

a second port communicatively coupleable to the distributed sensing interrogator for receiving the single-mode optical signal from the distributed sensing interrogator; and a third port coupled to the optical amplifier for routing the single-mode optical signal to the optical amplifier.

18. The system of claim 16, wherein the second single-mode circulator comprises:

a first port coupled to the optical filter for receiving the filtered single-mode optical signal;

a second port coupled to the second single-mode optical fiber for routing the filtered single-mode optical signal to the second single-mode optical fiber; and a third port communicatively coupleable to an optical splice for receiving the reflective optical signal from the second single-mode optical fiber and routing the reflective optical signal to the optical splice.

19. The system of claim 16, wherein the distributed sensing optical fiber amplifier further comprises:

a second optical amplifier coupled to the second single-mode circulator for amplifying the reflective optical signal.

20. The system of claim 19, wherein the distributed sensing optical fiber amplifier further comprises:

a second optical filter coupled to the second optical amplifier for filtering one or more noise components from the amplified reflective optical signal and routing the filtered reflective optical signal to the first single-mode optical fiber.

21. The system of claim 20, wherein the single-mode optical signal and the filtered reflective optical signal have a same signal intensity.

* * * * *